US010545785B1

(12) United States Patent
Subraya et al.

(10) Patent No.: US 10,545,785 B1
(45) Date of Patent: Jan. 28, 2020

(54) VIRTUAL HOST BUS ADAPTER LOGINS

(71) Applicant: Hewlett Packard Enterprise Development LP, Houston, TX (US)

(72) Inventors: Sumangala Bannur Subraya, Bangalore (IN); Paulose Kuriakose Arackal, Bangalore (IN); Sreenivasa Prasad Vellalore, Bangalore (IN)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 0 days.

(21) Appl. No.: 16/186,738

(22) Filed: Nov. 12, 2018

(51) Int. Cl.
*G06F 9/455* (2018.01)
*G06F 13/38* (2006.01)
*G06F 13/40* (2006.01)
*H04L 12/931* (2013.01)

(52) U.S. Cl.
CPC ........ *G06F 9/45558* (2013.01); *G06F 13/385* (2013.01); *G06F 13/404* (2013.01); *G06F 13/4022* (2013.01); *H04L 49/354* (2013.01); *H04L 49/357* (2013.01); *G06F 2009/45595* (2013.01); *G06F 2213/0058* (2013.01)

(58) Field of Classification Search
CPC .................................................. G06F 9/45558
See application file for complete search history.

(56) References Cited

U.S. PATENT DOCUMENTS

| 7,778,157 | B1 | 8/2010 | Tawri | |
| 8,041,987 | B2 * | 10/2011 | Allen | G06F 11/2005 |
| | | | | 714/4.11 |
| 8,510,815 | B2 * | 8/2013 | Sekiguchi | H04L 63/102 |
| | | | | 370/357 |
| 2008/0313724 | A1 | 12/2008 | Doddapaneni | |
| 2009/0116381 | A1 | 5/2009 | Kanda | |
| 2013/0013285 | A1 | 1/2013 | Cyr | |
| 2015/0370610 | A1 | 12/2015 | Amann | |

OTHER PUBLICATIONS

"Best Practices Guide: Emulex Virtual HBA Solutions and VMware ESX Server 3.5," Jul. 29, 2008, <ttps://www.vmware.com/content/dam/digitalmarketing/vmware/en/pdf/techpaper/VMware Emulex Best Practices for Virtual HBA V4.pdf.

* cited by examiner

*Primary Examiner* — Charlie Sun
(74) *Attorney, Agent, or Firm* — Brooks, Cameron & Huebsch, PLLC

(57) ABSTRACT

Example implementations relate to virtual host bus adapter logins. A hypervisor may comprise a processing resource and a memory resource storing non-transitory machine-readable instructions to cause the processing resource to query a computing device to determine port identity information of a plurality of virtual host bus adapters (VHBAs) associated with a physical host bus adapter (HBA) of the computing device and uplink mappings for the plurality of VHBAs, determine a bandwidth allocation of each of the plurality of VHBAs, rank each of the plurality of VHBAs, and cause each of the plurality of VHBAs to login via the determined uplink mappings based on the rank of each of the plurality of VHBAs.

20 Claims, 5 Drawing Sheets

218

| BANDWIDTH ALLOCATION: COMPUTING DEVICE A | BANDWIDTH ALLOCATION: COMPUTING DEVICE B | HYPERVISOR ORDER |
|---|---|---|
| VHBA108-1: 25% | VHBA108-4: 50% | Port 1:<br>1.) VHBA108-4 (50%)<br>2.) VHBA108-1 (25%)<br>3.) VHBA108-M (25%) |
| VHBA108-2: 50% | VHBA108-5: 25% | |
| VHBA108-M: 25% | VHBA108-N: 25% | |
| | | Port 2:<br>1.) VHBA108-2 (50%)<br>2.) VHBA108-5 (25%)<br>3.) VHBA108-N (25%) |

FIG. 2

VIRTUAL HOST BUS ADAPTER LOGINS

BACKGROUND

A virtual fibre channel (VFC) can allow a virtual machine (VM) to make connections. For instance, a VM may utilize a VFC to access fibre channel-based storage of a storage area network (SAN).

N_Port ID virtualization (NPIV) can virtualize a physical host bus adapter (HBA) port in a fabric storage area network (SAN) topology. The HBA virtualization technology can allow a single physical HBA port to operate as multiple virtual HBA (VHBA) ports, where each of the VHBAs can have its own identity.

In some instances, many VMs can access portions of the SAN via a corresponding VHBA. That is, each VM can access storage via a VHBA. For example, certain ports can be virtualized using NP IV to allow multiple VMs access to storage while also providing storage isolation.

BRIEF DESCRIPTION OF THE DRAWINGS

FIG. 2 illustrates an example VHBA allocation table consistent with the disclosure.

DETAILED DESCRIPTION

A VFC can be useful to virtualize certain storage computing devices (e.g., servers). As used herein, the term "virtual fibre channel" (e.g., VFC) refers to a hypervisor feature to allow VMs to connect to fibre channel-based storage using a standard World Wide Name (WWN) associated with each VHBA which is mapped to a corresponding VM. As used herein, the term "hypervisor" refers to computing device software, firmware, or hardware that creates and runs virtual machines. As used herein, the term "virtual machine" (e.g., VM) refers to an emulation of a computer system. For example, a VM can utilize a VFC/VHBA to connect to/access fibre channel-based storage. In an example in which a hypervisor creates multiple VMs, the multiple guest VMs can access isolated storage via corresponding VHBAs.

As described above, some HBAs may allow for virtualized HBAs (e.g., VHBAs) to be created on the HBA. As used herein, the term "virtual HBA" (e.g., VHBA) refers to an emulation of an HBA port. A VM may connect to/access storage via an associated VHBA.

A VM can utilize a virtualized port (e.g., a VHBA) to connect to/access storage. To do so, a VM can utilize a virtualized host bus adapter (VHBA) which may be virtualized on a physical HBA. As used herein, the term "HBA" refers to a device that connects a host element to other network and/or storage elements. For example, a physical HBA can connect a computing device to, in some examples, an access gateway.

In an example in which a hypervisor creates multiple VMs, the multiple VMs can access isolated storage via associated VHBAs by logging in to ports of an access gateway to access uplinks. In some examples, a physical HBA having the multiple VHBAs can allot bandwidth per VFC/VHBA.

Distribution of logins to the port/uplink of the access gateway may be by predefined method. For example, distribution of VFC/VHBA logins may be performed according to a round robin and least login method. However, as a result of the allotted bandwidth per VFC/VHBA, the predefined method of distribution of VFC/VHBA logins to the access gateway uplinks may cause a particular uplink to be overloaded if multiple high-bandwidth VFC/VHBAs are distributed to the particular uplink.

Virtual fibre channel logins according to the disclosure can allow for an automated way to distribute VFC/VHBA logins to uplinks while avoiding overloading a particular uplink with high-bandwidth VFC/VHBAs. According to examples of the disclosure, the bandwidth allocation of the VFC/VHBAs can be utilized to order the logins of the VFC/VHBAs with uplinks to avoid overloading a particular uplink.

Figure 1:
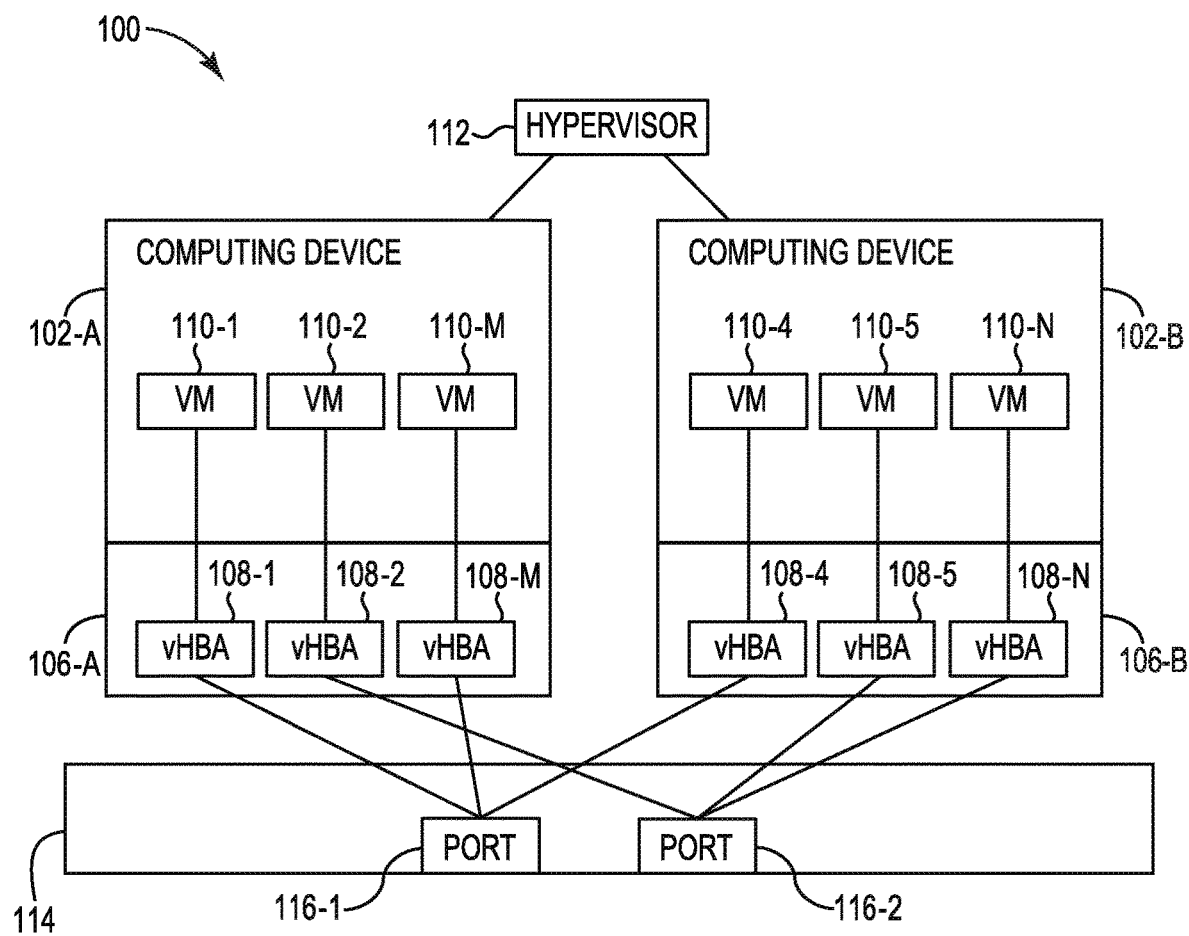
FIG. 1 illustrates an example system consistent with the disclosure.

FIG. 1 illustrates an example system 100 consistent with the disclosure. As illustrated in FIG. 1, the system 100 can include computing device 102, host bus adapter (HBA) 106, hypervisor 112, and access gateway 114.

As illustrated in FIG. 1, system 100 can include hypervisor 112. Hypervisor 112 is illustrated in FIG. 1 as being connected to computing devices 102-A and 102-B. Hypervisor 112 can be provisioned with processing resource(s) and memory resource(s). For example, hypervisor 112 can have access to a pool of processing resource(s) and/or memory resource(s) 106 such that the hypervisor 112 can ultimately execute instructions using the processing resource(s) and/or the memory resource(s). Accordingly, in some examples, the processing resource(s) and/or the memory resource(s) can be in a separate physical location than the hypervisor 112. However, examples described herein are not so limited. For example, hypervisor 112 can be provided as part of a computing network or computing system (e.g., computing devices 102). In some examples, the hypervisor 112 and provisioned processing resource(s) and/or memory resource(s) may be separately considered an "apparatus".

The provisioned processing resource(s) can include hardware, circuitry, and/or logic that can execute instructions (e.g., computer code, software, machine code, etc.) to perform tasks and/or functions to facilitate virtual fibre channel logins as described in more detail herein.

Hypervisor 112 can query computing devices 102-A and/or 102-B. As used herein, the term "query" refers to a request for information. For example, hypervisor 112 can request information from computing devices 102-A and/or 102-B. The information can include port identity information and uplink mappings for various VHBAs, as is further described herein.

Hypervisor 112 can query computing devices 102-A and/or 102-B for port identity information. The port identity information can be for VHBAs associated with the computing device 102. For example, hypervisor 112 can query computing device 102-A for port identity information of VHBAs 108-1, 108-2, and/or 108-M. As another example, hypervisor 112 can query computing device 102-B for port identity information of VHBAs 108-4, 108-5, and/or 108-N.

Hypervisor 112 can query computing devices 102-A and/or 102-B to determine port identity information of VHBAs associated with computing devices 102 via a registered state change notification (RSCN). As used herein, the term "registered state change notification" (e.g., RSCN)

refers to a fibre channel fabric's notification sent to already registered nodes in an event of a change in the fabric. As used herein, the term "fibre channel fabric" refers to a network topology in which network nodes interconnect via one network device or more than one network device (e.g., switches). For example, in the event of a change in the fibre channel fabric, such as an addition and/or removal of a VM, an RSCN can be generated.

Port identity information of VHBAs 108 can include a fibre channel node port (N_Port) identifier (ID) of each VHBA of the VHBAs 108. As used herein, the term "fibre channel node port identifier" (e.g., N_Port ID) refers to an assigned port identifier. As described above, multiple VMs 110 can access isolated storage via associated vHBAs 108 by logging in to ports 116 of an access gateway 114. To facilitate the multiple VMs utilizing a particular port 116, N_Port ID virtualization (NPIV) can be used. For example, multiple N_Port IDs can share a single physical port (e.g., port 116-1 or 116-2), as is further described herein. Using NPIV can allow a VM to access a same isolated storage (e.g., in a SAN) without other VMs being able to access the isolated storage. As used herein, the term "access gateway" refers to a device that transforms data received from an entity into a format that can be utilized by a network.

Port identity information of VHBAs 108 can include an area of each N_Port ID of each VHBA of the VHBAs 108. As used herein, the term "area" refers to information about an area within each domain. For example, the domain identification identifies the network (e.g., SAN) fabric. Ranking of the VHBAs 108 can depend on the domain and area of each N_Port ID of each VHBA of the VHBAs 108. For example, if the N_Port ID is "0x20301", the domain can be "0x2", the area can be "0X03", and port ID can be "0x01".

Port identity information of VHBAs 108 can include a port world wide name (PWWN) of each VHBA 108 of the VHBAs 108. As used herein, the term "port world wide name" (e.g., PWWN) refers to a unique port identifier assigned to a port in a fibre channel fabric. For example, each VHBA 108 can have a unique assigned port identifier which can be determined by hypervisor 112.

As described above, hypervisor 112 can determine the port identity information of VHBAs 108 via an RSCN. An RSCN can be generated in response to a change in a fibre channel network fabric. In some examples, the network fabric can be a SAN fabric. Accordingly, hypervisor 112 can bring VMs 110 online to generate RSCNs. For example, VM 110-1, 110-2, and 110-M can be brought online to cause changes in the fibre channel SAN fabric (e.g., the addition of VMs 110-1, 110-2, and 110-M to the SAN fabric). As a result of VMs 110-1, 110-2, and 110-M coming online, RSCNs can be generated for each VM 110-1, 110-2, and 110-M. Similarly, VMs 110-4, 110-5, and 110-N can be brought online to generate RSCNs.

Hypervisor 112 can utilize a last received RSCN to determine the port identity information of VHBAs 108. For example, if the VMs 110 are brought online in the order 110-1, 110-2, 110-M, 110-4, 110-5, and then 110-N, hypervisor 112 can utilize the RSCN generated in response to VM 110-N coming online to determine port identity information of VHBAs 108.

Hypervisor 112 can determine uplink mappings for VHBAs 108. As used herein, the term "uplink mapping" refers to an operation that associates an element of one set with an element of another set. For example, hypervisor 112 can determine an association of each VHBA 108 with ports 116.

Computing devices 102 can include a physical HBA 106. For example, computing device 102-A can include physical HBA 106-A and computing device 102-B can include physical HBA 106-B. As described above, some physical HBAs can allow for creation of VHBAs through which VMs may connect to/access storage via associated VHBAs. Accordingly, as illustrated in FIG. 1, HBA 106-A can include VHBAs 108-1, 108-2, 108-M and HBA 106-B can include VHBAs 108-4, 108-5, 108-N.

Each of the VHBAs 108 of a physical HBA 106 can have an allocated amount of bandwidth of the total bandwidth of the physical HBA 106. As used herein, the term "bandwidth" refers to a rate of data transfer across a given path. For example, VHBA 108-1 may be allocated 25% of the available bandwidth of HBA 106-A, VHBA 108-2 may be allocated 50% of the available bandwidth of HBA 106-A, and VHBA 108-M may be allocated 25% of the available bandwidth of HBA 106-A. Further, VHBA 108-4 may be allocated 50% of the available bandwidth of HBA 106-B, VHBA 108-5 may be allocated 25% of the available bandwidth of HBA 106-B, and VHBA 108-N may be allocated 25% of the available bandwidth of HBA 106-A.

As an example, a total bandwidth of HBA 106-A may be 8 gigabytes (GB). Accordingly, VHBA 108-1 may be allocated 2 GB, VHBA 108-2 may be allocated 4 GB, and VHBA 108-M may be allocated 2 GB. Further, a total bandwidth of HBA 106-B may be 8 GB such that VHBA 108-4 may be allocated 4 GB, VHBA 108-5 may be allocated 2 GB, and VHBA 108-N may be allocated 2 GB.

Accordingly, hypervisor 112 can determine a bandwidth allocation of each VHBA 108 of the VHBAs 108. As described above, the bandwidth allocation can be from a total available bandwidth of the physical HBA 106 having the VHBAs 108. For example, hypervisor 112 can determine VHBA 108-1 may be allocated 25% of the available bandwidth of HBA 106-A, VHBA 108-2 may be allocated 50% of the available bandwidth of HBA 106-A, and VHBA 108-M may be allocated 25% of the available bandwidth of HBA 106-A. Further, VHBA 108-4 may be allocated 50% of the available bandwidth of HBA 106-B, VHBA 108-5 may be allocated 25% of the available bandwidth of HBA 106-B, and VHBA 108-N may be allocated 25% of the available bandwidth of HBA 106-A.

The bandwidth allocation of each of the VHBAs 108 may be predefined. For example, during creation of VMs 110 via hypervisor 112, a user creating the VMs 110/VHBAs 108 can specify an allocated bandwidth amount to the VHBAs from the total available bandwidth of the physical HBA 106.

As described above, hypervisor 112 can create VMs 110 and VHBAs 108. Accordingly, each VHBA 108 can be associated with a VM 110 of computing device 102. For example, VHBA 108-1 can be associated with VM 110-1, VHBA 108-2 can be associated with VM 110-2, VHBA 108-M can be associated with VM 110-M, VHBA 108-4 can be associated with VM 110-4, VHBA 108-5 can be associated with VM 110-5, and VHBA 108-N can be associated with VM 110-N.

Hypervisor 112 can rank each of the VHBAs 108 based on the bandwidth allocation. That is, hypervisor 112 can rank each of the VHBAs 108 according to an amount of bandwidth. For example, hypervisor 112 can rank VHBA 108-2 and 108-4 as a highest rank (e.g., since VHBA 108-2 and VHBA 108-4 have 50% allocated bandwidth of their respective HBAs 106). Further, hypervisor 112 can rank VHBA 108-1, 108-M, 108-5, and 108-N as a lowest rank (e.g., since VHBA 108-1, 108-M, 108-5, and 108-N have 25% allocated bandwidth of their respective HBAs 106).

Hypervisor 112 can cause each of the VHBAs 108 to login via the determined uplink mappings. As used herein, the term "login" refers to the process of accessing a system for use. For example, VHBAs 108 can access for use ports 116, as is further described herein. Hypervisor 112 can cause the VHBAs 108 to login based on the rank of each of the VHBAs 108. Hypervisor 112 can cause the VHBAs 108 to login by overriding any default distribution of VHBA login orders that may exist.

Hypervisor 112 can cause VHBAs 108 to login in order of the ranked highest bandwidth allocation to lowest bandwidth allocation. For example, as previously described above, VHBAs 108-2 and 108-4 have 50% allocated bandwidth of their respective HBAs 106 and as such, can be ranked higher than VHBAs 108-1, 108-M, 108-5, and 108-N as they have 25% of allocated bandwidth of their respective HBAs 106. Therefore, according to the uplink mappings, hypervisor 112 can cause, in order, VHBA 108-4 to login to port 116-1, VHBA 108-2 to login to port 116-2, VHBA 108-1 to login to port 116-1, VHBA 108-5 to login to port 116-2, VHBA 108-M to login to port 116-1, and VHBA 108-N to login to port 116-2. As a result, port 116-1 can have VHBAs 108-4, 108-1, and 108-M with a total bandwidth of 100% (e.g., VHBA 108-4: 50%; VHBA 108-1: 25%; VHBA 108-M: 25%), and port 116-2 can have VHBAs 108-2, 108-5, and 108-N with a total bandwidth of 100% (e.g., VHBA 108-2: 50%; VHBA 108-5: 25%; VHBA 108-N: 25%).

Causing VHBAs 108 to login in order of the ranked highest bandwidth allocation to lowest bandwidth allocation can prevent ports 116-1 and/or 116-2 from being overloaded. For example, if VHBAs 108 were to login to port 116-1 in round robin fashion in an order in which they were created, port 116-1 could potentially have VHBA 108-2, 108-4, and 108-5 logging in, which could cause port 116 to be overloaded (e.g., VHBA 108-2: 50%; VHBA 108-4: 50%; VHBA 108-5: 25%; Resulting in 125% bandwidth allocation on port 116-1).

As described above, in some examples, a change in a SAN fabric can occur. For example, a VM 110 (e.g., VM 110-N) may go online (e.g., be logged in and added to the SAN fabric) or go offline (e.g., be logged out and removed from the SAN fabric). In response to a change in the SAN fabric, an RSCN can be generated. Accordingly, hypervisor 112 can perform the steps above in response to the RSCN being generated. In an example in which a VM 110-N is removed from the SAN fabric, hypervisor 112 can determine the bandwidth allocation of the VHBAs 108, rank the VHBAs 108 according to the bandwidth allocation, and cause the VHBAs 108 to login based on the ranked bandwidth allocation (e.g., from highest to lowest).

In some examples, hypervisor 112 can cause VHBAs 108 to logout. For example, in a first-run instance (e.g., hypervisor has not ranked/logged in the VHBAs), hypervisor 112 can cause VHBAs 108 to log out in response to the VHBAs 108 being logged on, the VHBAs 108 not being ordered from highest bandwidth allocation to lowest bandwidth allocation, and a bandwidth threshold of an uplink being exceeded. For example, if a bandwidth threshold of port 116-1 is 125%, the bandwidth threshold (e.g., 100%) may be exceeded and as a result, port 116-1 may be overloaded. Accordingly, hypervisor 112 can cause VHBAs 108-1, 108-2, 108-M, 108-4, 108-5, and/or 108-N to log out. Hypervisor 112 can then determine the bandwidth allocation of the VHBAs 108, rank the VHBAs 108 according to the bandwidth allocation, and cause the VHBAs 108 to login in order of the highest bandwidth allocation to the lowest band width allocation.

Virtual fibre channel logins according to the disclosure can allow for distribution of VFC/VHBA logins to uplinks in a way to avoid overloading a particular uplink. High bandwidth VFC/VHBAs can be distributed to uplinks such that the uplinks do not exceed a bandwidth threshold. Accordingly, virtual fibre channel logins can avoid bandwidth issues in examples in which VFC/VHBAs are allocated bandwidth from a physical HBA. Further, dynamic changes in bandwidth assignments can be accounted for by evenly distributing traffic across the uplinks. Further, dynamic rebalancing can be accomplished according to allocated bandwidth, especially in situations in which a SAN fabric changes, such as the addition and/or removal of VMs.

FIG. 2 illustrates an example VHBA allocation table 218 consistent with the disclosure. As illustrated in FIG. 2, VHBA allocation table 218 includes bandwidth allocation of computing device A, bandwidth allocation of computing device B, and hypervisor orders.

As illustrated in FIG. 2, VHBA allocation table 218 can include bandwidth allocation of computing devices A and B. Computing device A can correspond to computing device 102-A and computing device B can correspond to computing device 102-B, described in connection with FIG. 1.

As described in connection with FIG. 1, computing devices A and B can include instances of VMs. The VMs can have corresponding VHBAs.

A physical HBA can allocate bandwidth to VHBAs residing on the physical HBA. For example, for computing device A, a physical HBA can allocate 25% of the available bandwidth of the physical HBA to a first VHBA, 50% of the available bandwidth to a second VHBA, and 25% of the available bandwidth to a third VHBA. Similarly, VHBA 108-4 of a different physical HBA (e.g., HBA 106-B, as described in connection with FIG. 1) can include 50% of the allocated bandwidth of the different physical HBA, VHBA 108-5 can include 25% of the allocated bandwidth of the different physical HBA, and VHBA 108-N can include 25% of the allocated bandwidth of the different physical HBA.

A hypervisor can rank the VHBAs according the bandwidth allocation and cause the VHBAs to login in order of the ranked highest bandwidth allocation to lowest bandwidth allocation. For example, as shown in VHBA allocation table 218, the hypervisor can cause VHBAs 108-4, 108-1, and then 108-M to login, in order, to port 1 (e.g., port 116-1, as described in connection with FIG. 1). Further, the hypervisor can cause VHBAs 108-2, 108-5, and 108-N to login, in order, to port 2 (e.g., port 116-2, as described in connection with FIG. 1).

Figure 3:
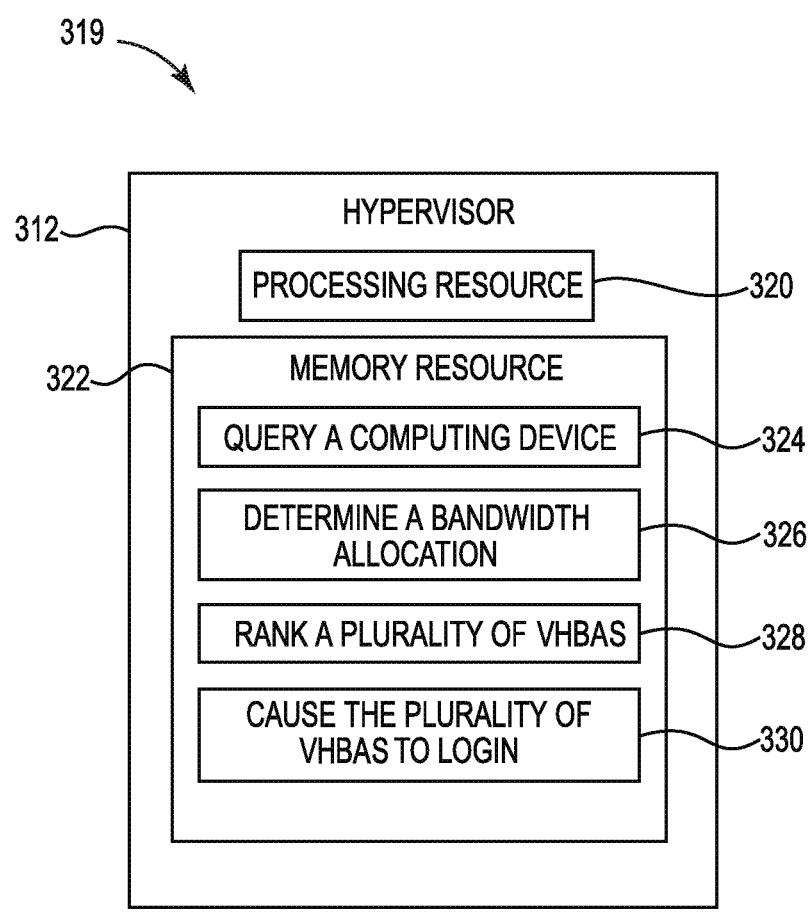
FIG. 3 is a block diagram of an example hypervisor for virtual host bus adapter logins consistent with the disclosure.

FIG. 3 is a block diagram 319 of an example hypervisor 312 for virtual fibre channel logins consistent with the disclosure. As described herein, the hypervisor 312 may perform a number of functions related to virtual fibre channel logins. Although not illustrated in FIG. 3, the hypervisor 312 may include a processor and a machine-readable storage medium. Although the following descriptions refer to a single processor and a single machine-readable storage medium, the descriptions may also apply to a system with multiple processors and multiple machine-readable storage mediums. In such examples, the hypervisor 312 may be distributed across multiple machine-readable storage mediums and the hypervisor 312 may be distributed across multiple processors. Put another way, the instructions executed by the hypervisor 312 may be stored across multiple machine-readable storage mediums and executed across multiple processors, such as in a distributed or virtual computing environment.

As illustrated in FIG. 3, the hypervisor 312 may comprise a processing resource 320, and a memory resource 322 storing machine-readable instructions to cause the hypervisor 312 to perform a number of operations relating to virtual fibre channel logins. That is, using the processing resource 320 and the memory resource 322, the hypervisor 312 may cause VHBAs to login via determined uplink mappings in order of highest bandwidth allocation to lowest bandwidth allocation, among other operations. Processing resource 320 may be a central processing unit (CPU), microprocessor, and/or other hardware device suitable for retrieval and execution of instructions stored in memory resource 322.

The hypervisor 312 may include instructions 324 stored in the memory resource 322 and executable by the processing resource 320 to query a computing device. The computing device being queried can be a server. The server may include instances of VMs. The hypervisor 312 can query a computing device for port identity information of VHBAs associated with VMs as well as uplink mappings of the VHBAs.

The hypervisor 312 may include instructions 326 stored in the memory resource 322 and executable by the processing resource 320 to determine a bandwidth allocation. For example, hypervisor 312 can determine a bandwidth allocation of each of the VHBAs. An HBA associated with the computing device can have VHBAs through which VMs may connect to/access storage via associated VHBAs. The VHBAs of the HBA can have a bandwidth allocation of a total bandwidth of the HBA.

The hypervisor 312 may include instructions 328 stored in the memory resource 322 and executable by the processing resource 320 rank each of the VHBAs. Hypervisor 312 can rank the VHBAs according to an amount of bandwidth. That is, hypervisor 312 can rank the VHBAs from the highest bandwidth allocation to the lowest bandwidth allocation.

The hypervisor 312 may include instructions 330 stored in the memory resource 322 and executable by the processing resource 320 to cause the VHBAs to login. Hypervisor 312 can cause the VHBAs to login to a port of an access gateway via the determined uplink mappings based on the rank of the VHBAs. In other words, hypervisor 312 can cause VHBAs to login in order of the ranked highest bandwidth allocation to the lowest bandwidth allocation.

In this manner, the hypervisor 312 can cause virtual fibre channel logins by logging in VHBAs in order of highest bandwidth allocation to lowest bandwidth allocation. Using virtual fibre channel logins can allow for distribution of VHBA logins to uplinks in a way to avoid overloading a particular uplink.

Figure 4:
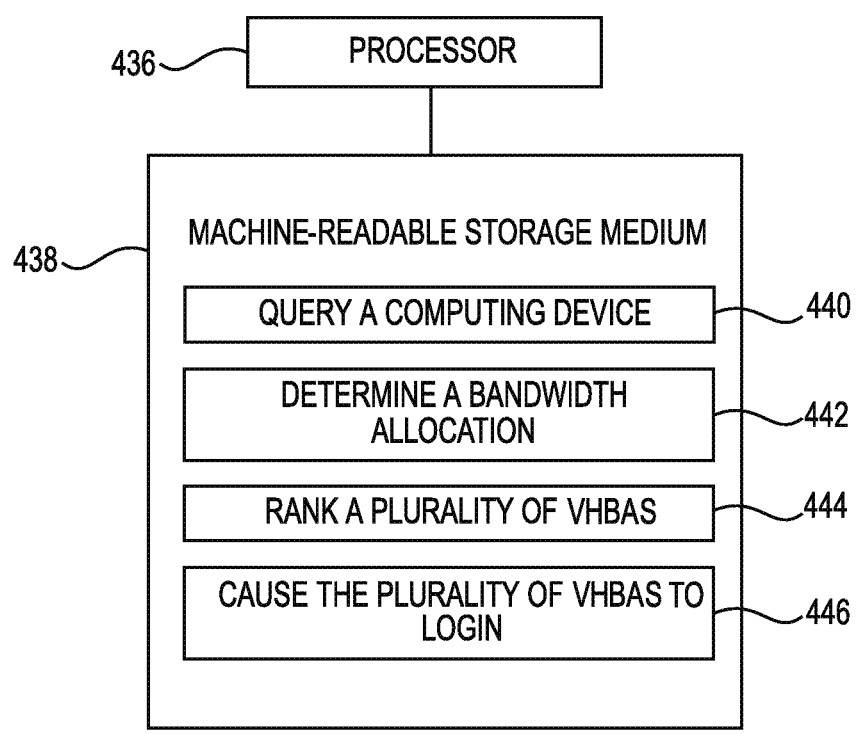
FIG. 4 is a block diagram of an example system consistent with the disclosure.

FIG. 4 is a block diagram of an example system 434 consistent with the disclosure. In the example of FIG. 4, system 434 includes a processor 436 and a machine-readable storage medium 438. Although the following descriptions refer to a single processor and a single machine-readable storage medium, the descriptions may also apply to a system with multiple processors and multiple machine-readable storage mediums. In such examples, the instructions may be distributed across multiple machine-readable storage mediums and the instructions may be distributed across multiple processors. Put another way, the instructions may be stored across multiple machine-readable storage mediums and executed across multiple processors, such as in a distributed computing environment.

Processor 436 may be a central processing unit (CPU), microprocessor, and/or other hardware device suitable for retrieval and execution of instructions stored in machine-readable storage medium 438. In the particular example shown in FIG. 4, processor 436 may receive, determine, and send instructions 440, 442, 444, and 446. As an alternative or in addition to retrieving and executing instructions, processor 436 may include an electronic circuit comprising a number of electronic components for performing the operations of the instructions in machine-readable storage medium 438. With respect to the executable instruction representations or boxes described and shown herein, it should be understood that part or all of the executable instructions and/or electronic circuits included within one box may be included in a different box shown in the figures or in a different box not shown.

Machine-readable storage medium 438 may be any electronic, magnetic, optical, or other physical storage device that stores executable instructions. Thus, machine-readable storage medium 438 may be, for example, Random Access Memory (RAM), an Electrically-Erasable Programmable Read-Only Memory (EEPROM), a storage drive, an optical disc, and the like. The executable instructions may be "installed" on the system 434 illustrated in FIG. 4. Machine-readable storage medium 438 may be a portable, external or remote storage medium, for example, that allows the system 434 to download the instructions from the portable/external/remote storage medium. In this situation, the executable instructions may be part of an "installation package". As described herein, machine-readable storage medium 438 may be encoded with executable instructions for virtual fibre channel logins.

Query instructions 440, when executed by a processor such as processor 436, may cause system 434 to query a computing device. The computing device may be a server and may include instances of VMs. System 434 can query a computing device for port identity information of VHBAs associated with VMs as well as uplink mappings of the VHBAs.

Determine instructions 442, when executed by a processor such as processor 436, may cause system 434 to determine a bandwidth allocation of VHBAs from a total available bandwidth of a physical HBA having the VHBAs. The bandwidth allocation o the VHBAs may be predefined.

Rank instructions 444, when executed by a processor such as processor 436, may cause system 434 to rank each of the VHBAs based on the bandwidth allocation. System 434 can rank the VHBAs according to an amount of bandwidth. That is, system 434 can rank the VHBAs from the highest bandwidth allocation to the lowest bandwidth allocation.

Cause instructions 446, when executed by a processor such as processor 436, may cause system 434 to cause each of the VHBAs to login via the determined uplink mappings based on the rank of the VHBAs. In other words, system 434 can cause VHBAs to login in order of the ranked highest bandwidth allocation to the lowest bandwidth allocation.

Figure 5:
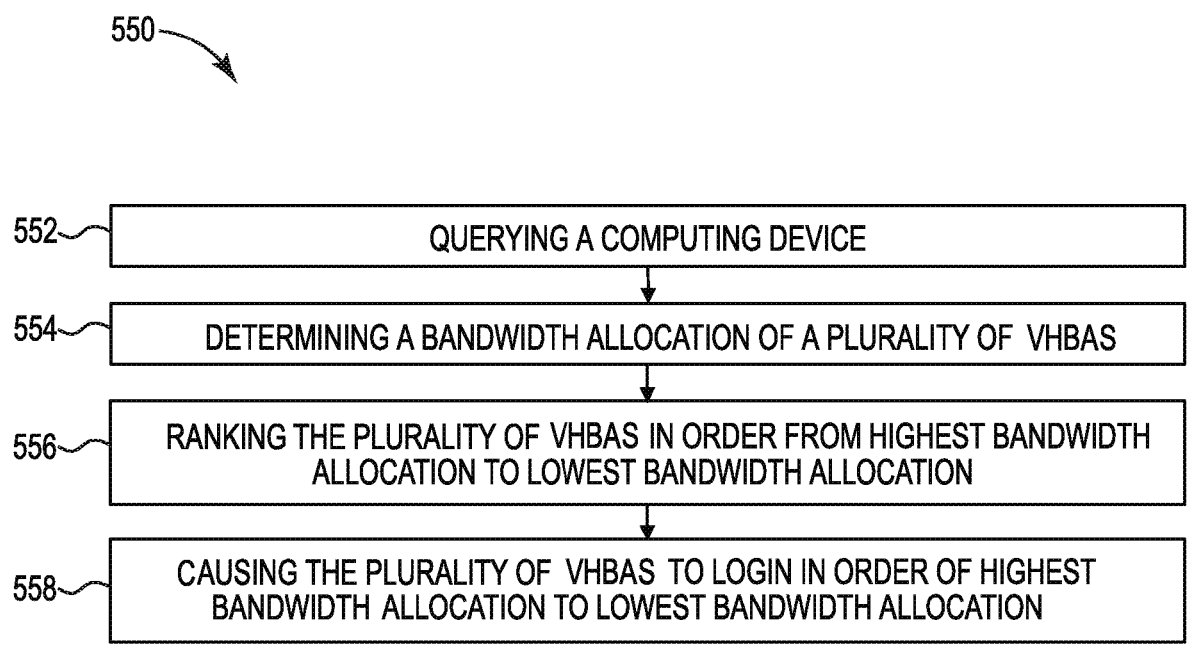
FIG. 5 illustrates an example method consistent with the disclosure.

FIG. 5 illustrates an example method 550 consistent with the disclosure. Method 550 may be performed, for example, by a hypervisor (e.g., hypervisor 112, 312, previously described in connection with FIGS. 1 and 3, respectively).

At 552, the method 550 includes querying a computing device. The computing device can be queried to determine port identity information of VHBAs associated with the computing device and uplink mappings for the VHBAs. The port identity information can be determined via a RSCN. The RSCN can be generated as a result of a change in the SAN fabric.

At 554, the method 550 includes determining a bandwidth allocation of VHBAs. The bandwidth allocation of the VHBAs can be determined from a total available bandwidth of a physical HBA having the VHBAs. Accordingly, each VHBA can include an allocated bandwidth of a total amount of bandwidth of a physical HBA having the VHBAs.

At 556, the method 550 includes ranking the VHBAs in order from highest bandwidth allocation to lowest bandwidth allocation. The VHBAs can be ranked in order by the hypervisor.

At 558, the method 550 includes causing the VHBAs to login in order of highest bandwidth allocation to lowest bandwidth allocation. The VHBAs can login via the determined uplink mappings.

The method 550 can be repeated in response to a change in the SAN fabric. For example, the SAN fabric may change when a VM is added and/or removed from the SAN fabric, as is further described herein.

In some examples, a change in the SAN fabric can occur when an addition of a VM occurs. The addition of a VM can include the addition of an associated new VHBA and can result in a change in bandwidth allocation of the VHBAs. As a result of the addition of the VM, an RSCN can be generated and the hypervisor can repeat method 550 to reorder the logins of the VHBAs.

In some examples, a change in the SAN fabric can occur when a removal of a VM occurs. The removal of a VM can include the removal of an associated VHBA and can result in a change in the bandwidth allocation of the remaining VHBAs. As a result of the removal of the VM, an RSCN can be generated and the hypervisor can repeat method 550 to reorder the logins of the VHBAs.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. Similar elements or components between different figures may be identified by the use of similar digits. For example, 112 may reference element "12" in FIG. 1, and a similar element may be referenced as 312 in FIG. 3. Elements shown in the various figures herein can be added, exchanged, and/or eliminated so as to provide a plurality of additional examples of the present disclosure. In addition, the proportion and the relative scale of the elements provided in the figures are intended to illustrate the examples of the present disclosure and should not be taken in a limiting sense.

What is claimed:

1. A hypervisor, comprising:
    a processing resource; and
    a memory resource storing non-transitory machine-readable instructions to cause the processing resource to:
        query a computing device to determine:
            port identity information of a plurality of virtual host bus adapters (VHBAs) associated with a physical host bus adapter (HBA) of the computing device; and
            uplink mappings for the plurality of VHBAs;
        determine a bandwidth allocation of each of the plurality of VHBAs;
        rank each of the plurality of VHBAs; and
        cause each of the plurality of VHBAs to login via the determined uplink mappings based on the rank of each of the plurality of VHBAs.

2. The hypervisor of claim 1, including instructions to cause the processing resource to rank each of the plurality of VHBAs based on the bandwidth allocation.

3. The hypervisor of claim 1, including instructions to cause each of the plurality of VHBAs to login in order of highest bandwidth allocation to lowest bandwidth allocation.

4. The hypervisor of claim 1, including instructions to cause the processing resource to determine the bandwidth allocation of each of the plurality of VHBAs from a total available bandwidth of the physical HBA having the plurality of VHBAs.

5. The hypervisor of claim 4, wherein each of the plurality of VHBAs corresponds to a virtual fiber channels (VFCs).

6. The hypervisor of claim 1, including instructions to cause the processing resource to determine the port identity information of the VHBAs via a registered state change notification (RSCN).

7. The hypervisor of claim 1, wherein the port identity information of the plurality of VHBAs includes a fibre channel node port (N_Port) identifier (ID) of each VHBA of the plurality of VHBAs.

8. The hypervisor of claim 7, wherein the port identity information of the plurality of VHBAs includes an area of each N_Port ID of each VHBA of the plurality of VHBAs.

9. The hypervisor of claim 1, wherein the port identity information of the plurality of VHBAs includes a port world wide name (PWWN) of each VHBA of the plurality of VHBAs.

10. A non-transitory computer readable medium storing instructions executable by a processing resource to cause the processing resource to:
    query a computing device to determine:
        port identity information of a plurality of virtual host bus adapters (VHBAs) associated with a physical host bus adapter (HBA) of the computing device via a registered state change notification (RSCN); and
        uplink mappings for the plurality of VHBAs;
    determine a bandwidth allocation of each of the plurality of VHBAs from a total available bandwidth of the physical HBA having the plurality of VHBAs;
    rank each of the plurality of VHBAs based on the bandwidth allocation; and
    cause each of the plurality of VHBAs to login via the determined uplink mappings based on the rank of each of the plurality of VHBAs.

11. The medium of claim 10, wherein each VHBA of the plurality of VHBAs is associated with a virtual machine (VM) of a plurality of VMs of the computing device.

12. The medium of claim 10, wherein the RSCN is generated in response to a change in a network fabric.

13. The medium of claim 10, wherein the bandwidth allocation of each of the plurality of VHBAs is predefined.

14. The medium of claim 10, including instructions to cause the plurality of VHBAs to logout in response to:
    the plurality of VHBAs being logged in;
    the plurality of VHBAs not being ordered from highest bandwidth allocation to lowest bandwidth allocation; and
    a bandwidth threshold of an uplink being exceeded.

15. The medium of claim 14, including instructions to cause the processing resource to:

rank the plurality of logged out VHBAs from highest bandwidth allocation to lowest bandwidth allocation; and cause each of the plurality of logged out VHBAs to login in order of the highest bandwidth allocation to the lowest bandwidth allocation.

16. A method, comprising:

querying, by a hypervisor, a computing device to determine:

port identity information of a plurality of virtual host bus adapters (VHBAs) associated with the computing device via a registered state change notification (RSCN); and uplink mappings for the plurality of VHBAs;

determining, by the hypervisor, a bandwidth allocation of each of the plurality of VHBAs from a total available bandwidth of a physical host bus adapter (HBA) having the plurality of VHBAs;

ranking, by the hypervisor, each of the plurality of VHBAs in order from highest bandwidth allocation to lowest bandwidth allocation; and causing, by the hypervisor, each of the plurality of VHBAs to login via the determined uplink mappings in order of highest bandwidth allocation to lowest bandwidth allocation.

17. The method of claim 16, wherein the method includes causing each of the plurality of VHBAs to login to a port of an access gateway in order of the highest bandwidth allocation to the lowest bandwidth allocation.

18. The method of claim 16, wherein the method is repeated in response to a change in a network fabric.

19. The method of claim 18, wherein the change in the network fabric includes an addition of a virtual machine (VM) having an associated new VHBA.

20. The method of claim 18, wherein the change in the network fabric includes a removal of a virtual machine (VM) having an associated VHBA.

* * * * *